(12) United States Patent
Yamada

(10) Patent No.: US 6,542,514 B1
(45) Date of Patent: Apr. 1, 2003

(54) BROADCAST COMMUNICATION SYSTEM AND BROADCAST COMMUNICATION METHOD

(75) Inventor: Koichi Yamada, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/220,748

(22) Filed: Dec. 23, 1998

(30) Foreign Application Priority Data

Dec. 26, 1997 (JP) .............................................. 9-360075

(51) Int. Cl.[7] ................................................. H04J 3/26
(52) U.S. Cl. .......................... 370/432; 370/390; 725/63
(58) Field of Search ................................ 370/230, 231, 370/321, 324, 329, 330, 503, 473, 252, 253, 432, 436, 437, 458, 395.4, 395.41, 390; 725/10, 32, 91, 96, 97, 16–21, 35, 46, 50, 64–66

(56) References Cited

U.S. PATENT DOCUMENTS 5,313,454 A * 5/1994 Bustini et al. ............... 370/231
6,178,448 B1 * 1/2001 Gray et al. .................. 709/224

FOREIGN PATENT DOCUMENTS

| GB | 2295709 | 6/1996 |
|----|---------|--------|
| GB | 2315967 | 2/1998 |
| GB | 2330494 | 4/1999 |
| JP | 61-274556 | 12/1986 |
| JP | 3-49337 | 3/1991 |
| JP | 8-88651 | 4/1996 |

* cited by examiner

Primary Examiner—Dang Ton
Assistant Examiner—Phuc Tran
(74) Attorney, Agent, or Firm—Dickstein Shapiro Morin & Oshinsky, LLP

(57) ABSTRACT

A broadcast communication system comprises a transmitting terminal which is effective to transmit broadcast data and a start time of the broadcast data. A first message processing device receives the broadcast data and the start data from the transmitting terminal. The first message processing device transmits the broadcast data based on a schedule and the start time to a second message processing device. The second message processing device receives the broadcast data and the start time from the first message processing device and generates executable broadcast traffic information based on prior traffic information and based on the start time. The second message processing device further selectively conveys the broadcast data to one of a plurality of receiving terminals. The second message processing device further forwards the executable broadcast traffic information to the first message processing device. The first message processing device produces the schedule of the broadcast data based on the executable broadcast traffic information.

14 Claims, 10 Drawing Sheets

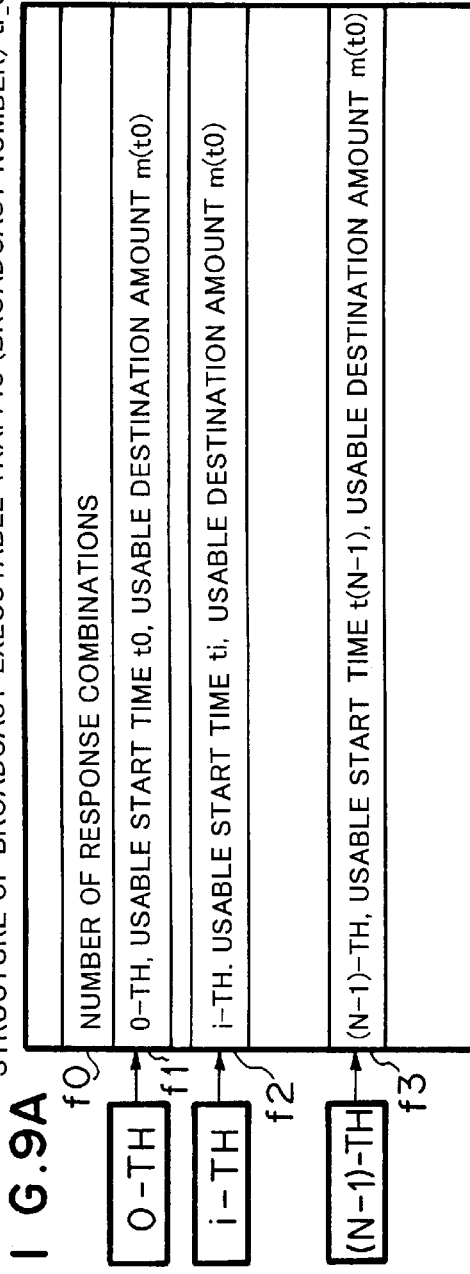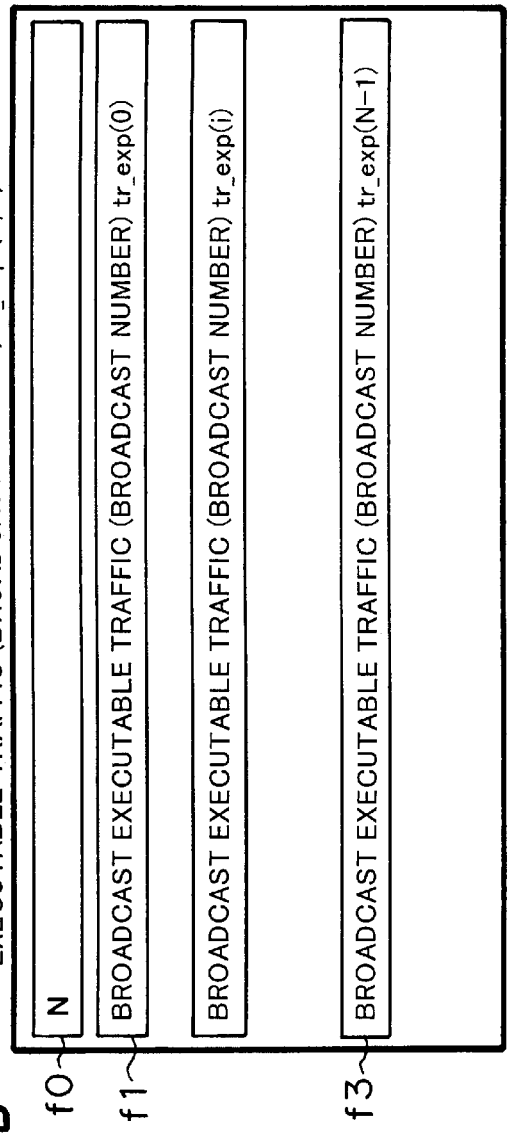

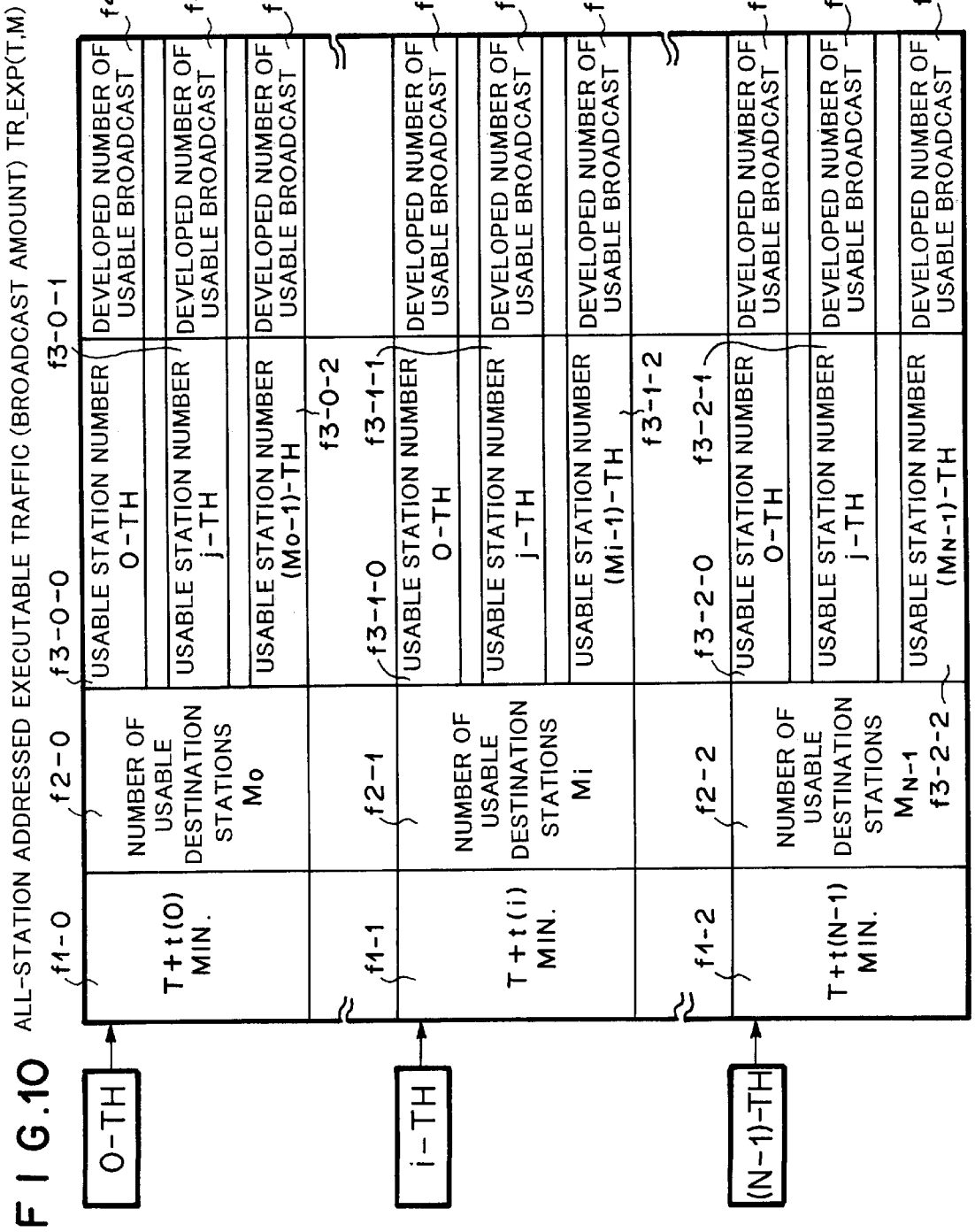

BROADCAST COMMUNICATION SYSTEM AND BROADCAST COMMUNICATION METHOD

BACKGROUND OF THE INVENTION

1. Field of the Invention

The present invention relates to a broadcast communication system and a broadcast communication method.

2. Description of the Prior Art

Heretofore, not only in a broadcast communication, but also in a point-to-point communication, a traffic control function block in a reception side or a destination side uses a method of transmitting a regulation signal at the time when congestion is detected, and transmitting a congestion release signal at the time when the congestion is released. Further, a sender side generally uses a monitoring and controlling method based on a response timer for measuring a response time from transmission and a retry frequency due to destination busy.

JPA-8-88651 discloses a broadcast traffic control system based on timer monitoring. That is, the transmission of messages is divided into a communication heavy (concentrated) period, a communication light (dispersed) period and an intermediate period. If the transmission is in the communication light period, broadcast communication is selected, and if the transmission is in the communication heavy period, point-to-point communication is selected. The timer monitoring is used to judge the type of the communication period.

However, the foregoing conventional technique has the following disadvantages:

A first disadvantage is that if the broadcast communication is carried out when general calls are most frequently made, equipments such as terminals become inaccessible, so that there is caused a probability that the broadcast communication would fail even when a timer is used or retrials are made.

A second disadvantage is that it is not certain for a transmission side of the broadcast communication what extent address simultaneous development of the broadcast communication can be made to even when a network resource is rarely used because the usage rate of the network resource is not certain, and thus the address simultaneous development of the broadcast communication is carried out within a limited address range in order not to magnify the effect on general calls to the network side, so that the network resource cannot be sufficiently used.

A third disadvantage is that when a broadcast communication is carried out, it is not certain for a user instructing the broadcast communication whether the broadcast communication is terminated until the user's desired date and hour, so that it is unclear whether the delivery can be completed until a desired time.

SUMMARY OF THE INVENTION

An object of the present invention is to increase the service completion rate of a broadcast communication service in order to enhance the service performance, and to shorten a service completion time of the broadcast communication when the resource using rate of a network by a general point-to-point call is low.

Another object of the present invention is to carry out a broadcast communication adaptive to a traffic at a service starting time point in the future subsequent to the current time, thereby suppressing the effect of a point-to-point communication on general calls to prevent impairment of users' utilization of the point-to-point communication.

Further object of the present invention is to notify a broadcast communication commander of a service completion prediction time to give the commander information to determine an operation, thereby enhancing the operability for the commander.

According to an aspect of the present invention, there is provided a broadcast communication system which comprises: a first terminal for transmitting broadcast data and transmitting a time when the broadcast data transmission starts; a first message communication processing apparatus for receiving the broadcast data and start time transmitted from the first terminal and transmitting the broadcast data and start time received from the first terminal; one or more second message communication processing apparatus for receiving the broadcast data and start time transmitted from the first message communication processing apparatus and transmitting the broadcast received from the first message communication processing apparatus; and one or more second terminals for receiving the broadcast data transmitted from the one or more second message communication processing apparatus; wherein the second message communication processing apparatus comprises means for generating executable broadcast traffic information on the basis of past traffic information and the start time; and wherein the first message communication processing apparatus comprises: means for retrieving the executable broadcast traffic information from the second message communication processing apparatus; means for scheduling transmission of the broadcast data from the first message communication processing apparatus on the basis of the executable broadcast traffic information.

The first message communication processing apparatus may further comprise means for inquiring the first terminal as to whether to execute the scheduled transmission of the broadcast data.

A time when the transmission of the broadcast data ends may be estimated on the basis of the past traffic information and the start time.

The executable broadcast traffic information may contain the number of the second terminals accessible for each of the second message communication processing apparatus every period of time from the start time of the transmission of the broadcast data to the end time of the transmission of the broadcast data.

The means for generating executable broadcast traffic information may use the number of broadcast calls, the number of general calls, the average number of destinations, and type and number of resources contained in the past traffic information corresponding to any one or more of the start time of transmission of the broadcast data, date of the time, one-or more-months-term including the date, the number of week including the date within a month, date of the week of the date, and whether the date is holiday.

The means for generating executable broadcast traffic information may further use current traffic for compensating the executable broadcast traffic information.

BRIEF DESCRIPTION OF THE DRAWINGS

FIGS. 9A and 9B are diagrams showing the construction of a broadcast executable traffic (number of broadcasts) tr_exp(T,M); and FIG. 10 is a diagram showing the construction of a all-station addressing broadcast executable traffic (number of broadcasts) TR_EXP (T,M).

DETAILED DESCRIPTION OF THE PREFERRED EMBODIMENT

The preferred embodiments according to the present invention will be explained hereunder with reference to the accompanying drawings.

Figure 1:
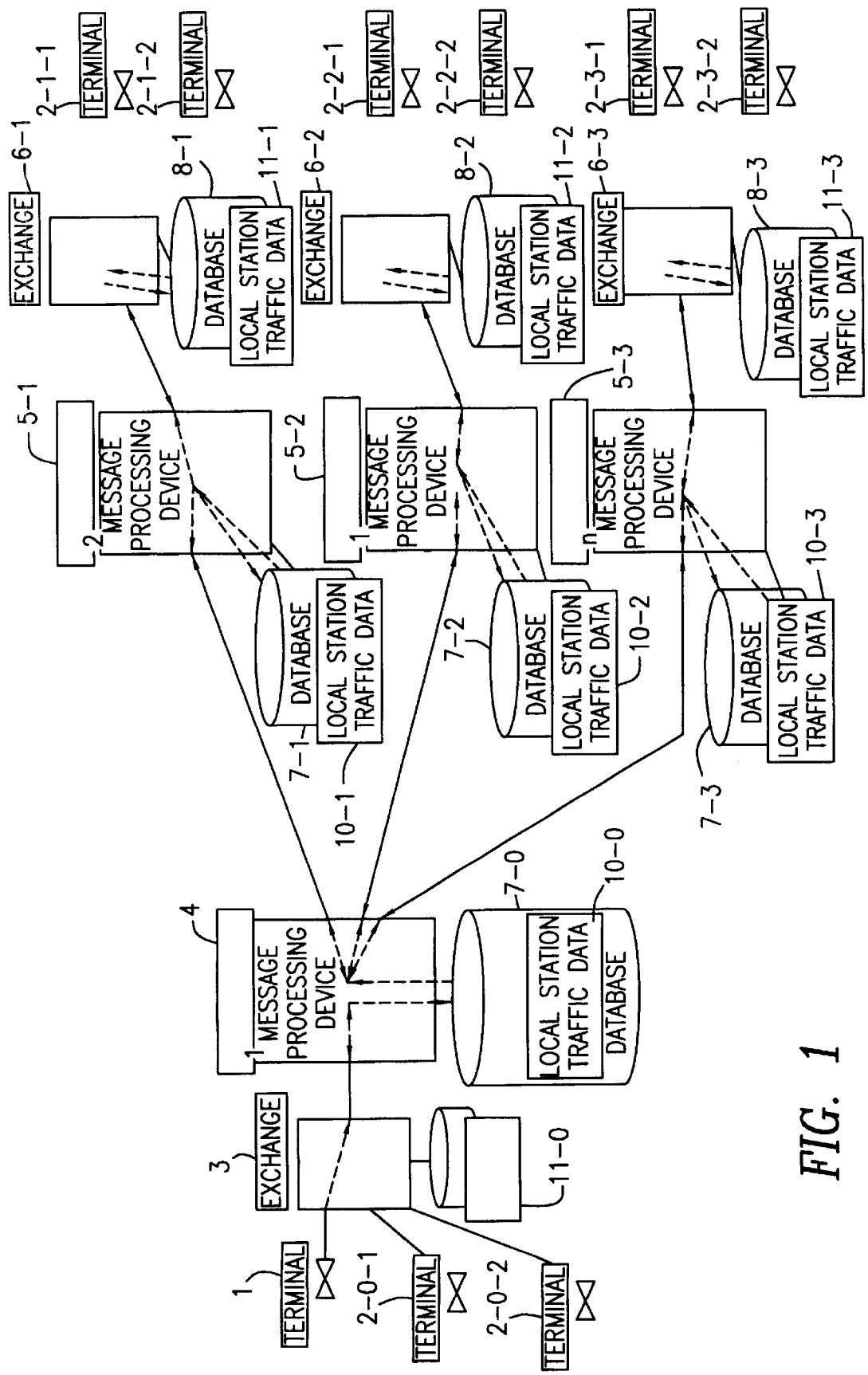
FIG. 1 is a diagram showing the construction of a first embodiment of the present invention.

FIG. 1 is a diagram showing the construction of the embodiment of the present invention.

As shown in FIG. 1, the embodiment of the present invention includes message processing device 4 for accepting a request for a broadcast service, message processing devices 5-1 to 5-3 for processing a reception message addressed to a broadcast destination, terminal 1 requesting the broadcast service, terminals 2-0-1 to 2-0-2 receiving the broadcast message, terminals 2-1-1 to 2-1-2 receiving the broadcast message, terminals 2-2-1 to 2-2-2 receiving the broadcast message, terminals 2-3-1 to 2-3-2 receiving the broadcast message, exchange 3 for relaying signals between each of terminals 1, 2-0-1, 2-0-2 and message processing device 4, exchange 6-1 for relaying signals between each of terminals 2-1-1 to 2-1-2 and message processing device 5-1, exchange 6-2 for relaying signals between each of terminals 2-2-1 to 2-2-2 and message processing device 5-2, and exchange 6-3 for relaying signals between each of terminals 2-3-1 to 2-3-2 and message processing device 5-3.

Figure 2:
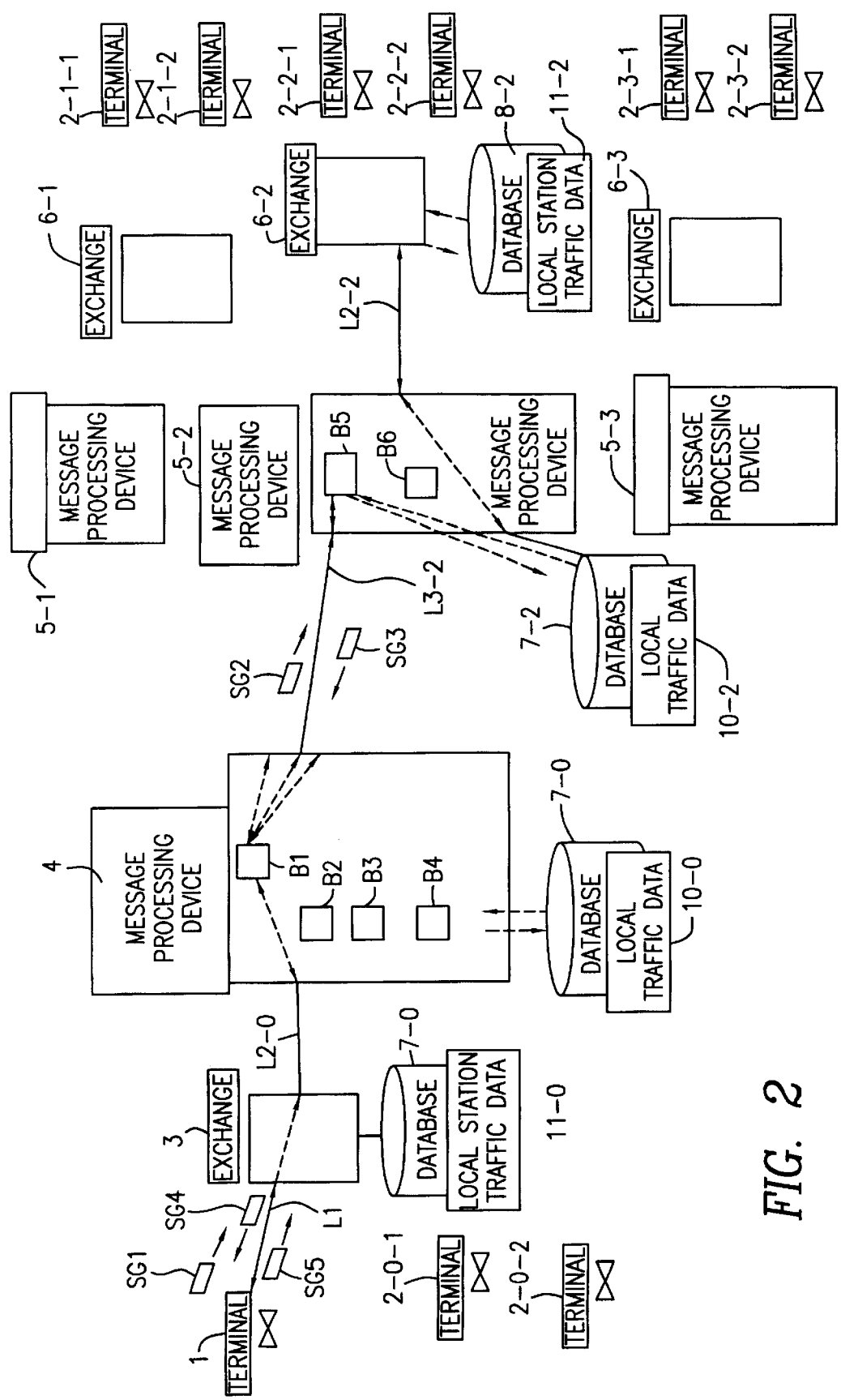
FIG. 2 is a diagram showing the operation of the first embodiment of the present invention.

FIG. 2 shows the operation of the embodiment. As shown in FIG. 2, broadcast control processing block B1, executable broadcast traffic inquiry processing block B2, broadcast execution instruction inquiry processing block B3 and broadcast execution processing block B4 are provided in message processing device 4 at a broadcast communication instruction station side, and executable broadcast traffic inquiry response processing block B5 and executable broadcast traffic prediction processing block B6 are provided in message communication processing devices 5-1 to 5-3 at a broadcast communication destination terminal side.

Next, the operation of the broadcast communication method will be explained with reference to, mainly FIG. 2 and other figures.

Broadcast control processing block B1 at the broadcast instruction side which is disposed in message communication processing device accepts broadcast request signal SG1 which is transmitted from broadcast request terminal 1 through logic channel L1, exchange 3 and logic channel L2-0, and executable broadcast traffic inquiry processing block B2 is started by broadcast control processing block B1.

Figure 4:
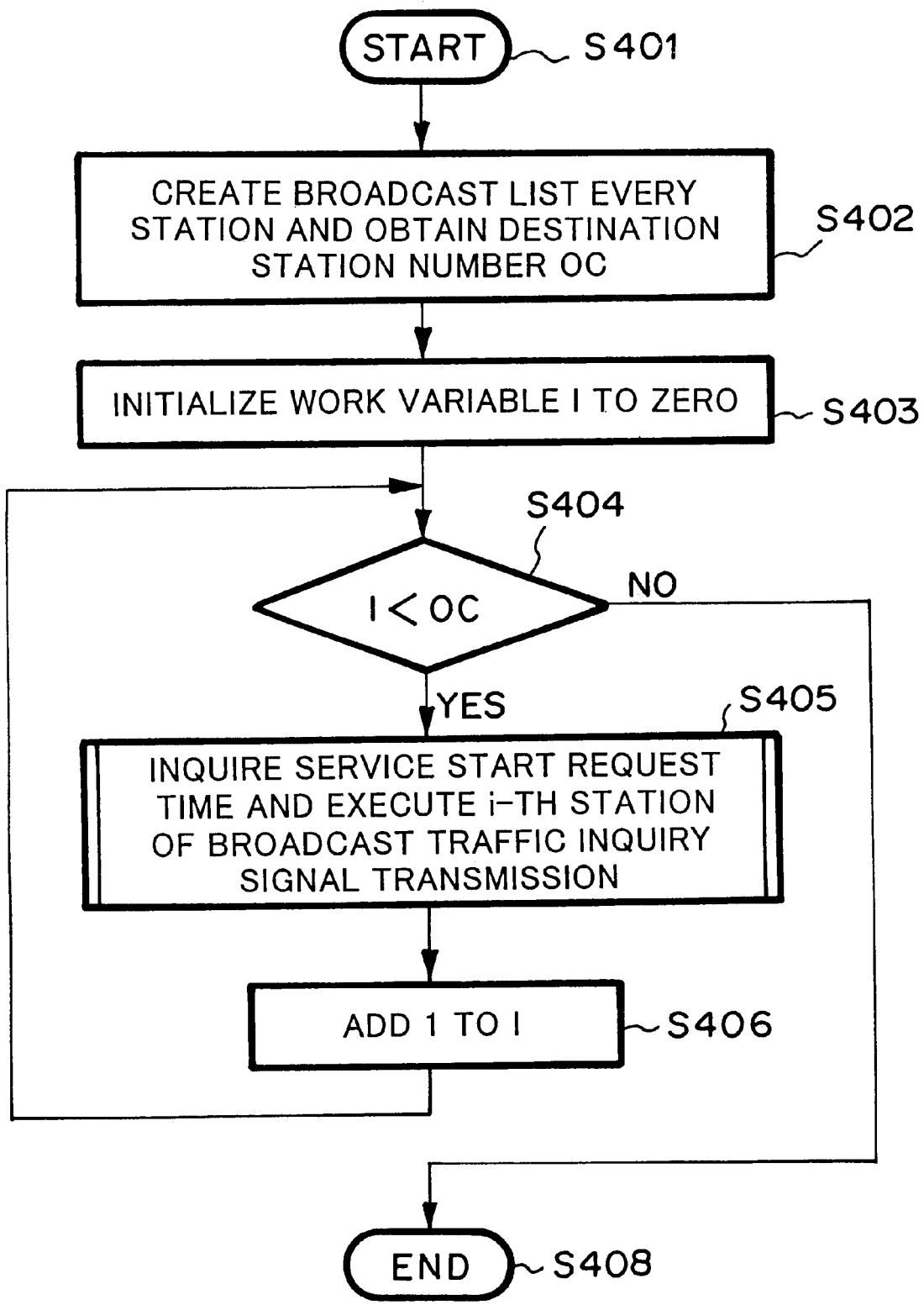
FIG. 4 is a flowchart showing the operation of a executable broadcast traffic inquiry processing block B2.

Next, the operation of executable broadcast traffic inquiry processing block B2 will be explained with reference to the flowchart in FIG. 4.

Executable broadcast traffic inquiry processing block B2 creates a broadcast list for every station and obtains a number of destination stations OC in S402. A work variable is initialized to 0 in S403. It is then determined whether I<OC is satisfied in S404. Transmission of the broadcast traffic inquiry signal to the I-th station is executed in S405. One is added to I in S406. Thereafter, the processing returns to S404 and then goes to S408 at the time when I becomes OC. At this time, the processing of FIG. 4 is finished, and the control processing returns to broadcast instruction side broadcast control processing block B1 of FIG. 2.

Next, the relationship between message communication processing device 4 and the I-th destination message communication processing device 5-2 will be explained with reference to FIG. 2.

Executable broadcast traffic inquiry signal SG2 which is transmitted under the control of executable broadcast traffic inquiry processing block B2 is received by message communication processing device 5-2 through logic connection L3-2 connecting message communication processing device 4 and message communication processing device 5-2. Executable broadcast traffic inquiry signal SG2 is processed in executable broadcast traffic inquiry response processing block B5 disposed in message communication processing device 5-2.

The same processing is also carried out in a destination message communication device group covering from the 0_-th destination message communication processing device 5-1 to (OC−1)-th destination message communication processing device 5-3.

Figure 7:
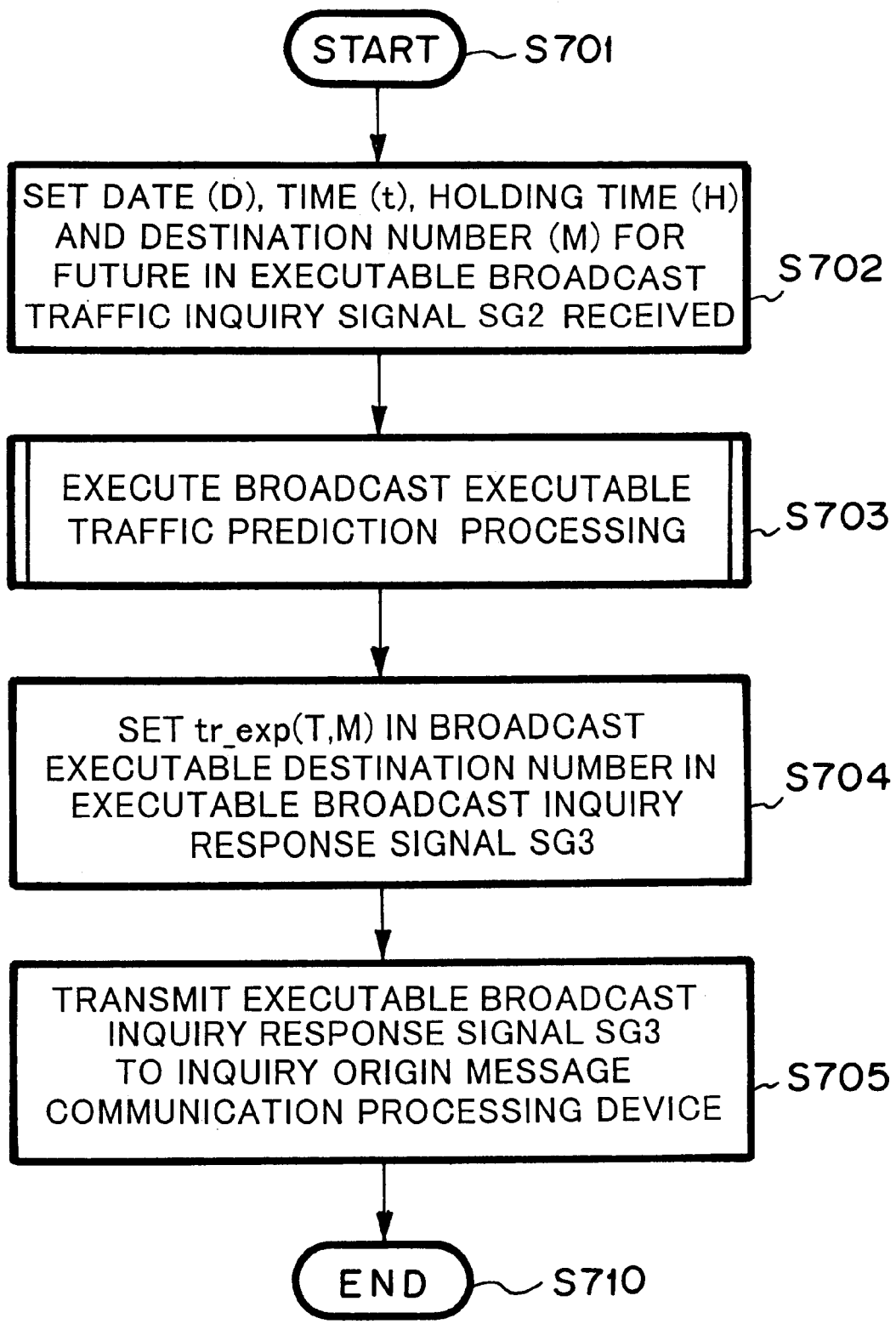
FIG. 7 is a flowchart showing the operation of a broadcast executable traffic inquiry response processing block.

Next, the operation of executable broadcast traffic inquiry response processing block B5 will be explained with reference to the flowchart in FIG. 7. First, executable broadcast traffic inquiry response processing block B5 sets the date (D), the time (T), the holding time (H) and the number of destinations (M) for the future in executable broadcast traffic inquiry signal SG2 in S702. Executable broadcast traffic prediction processing block B6 is started in S703. This is represented by B6 in FIG. 2.

Figure 8:
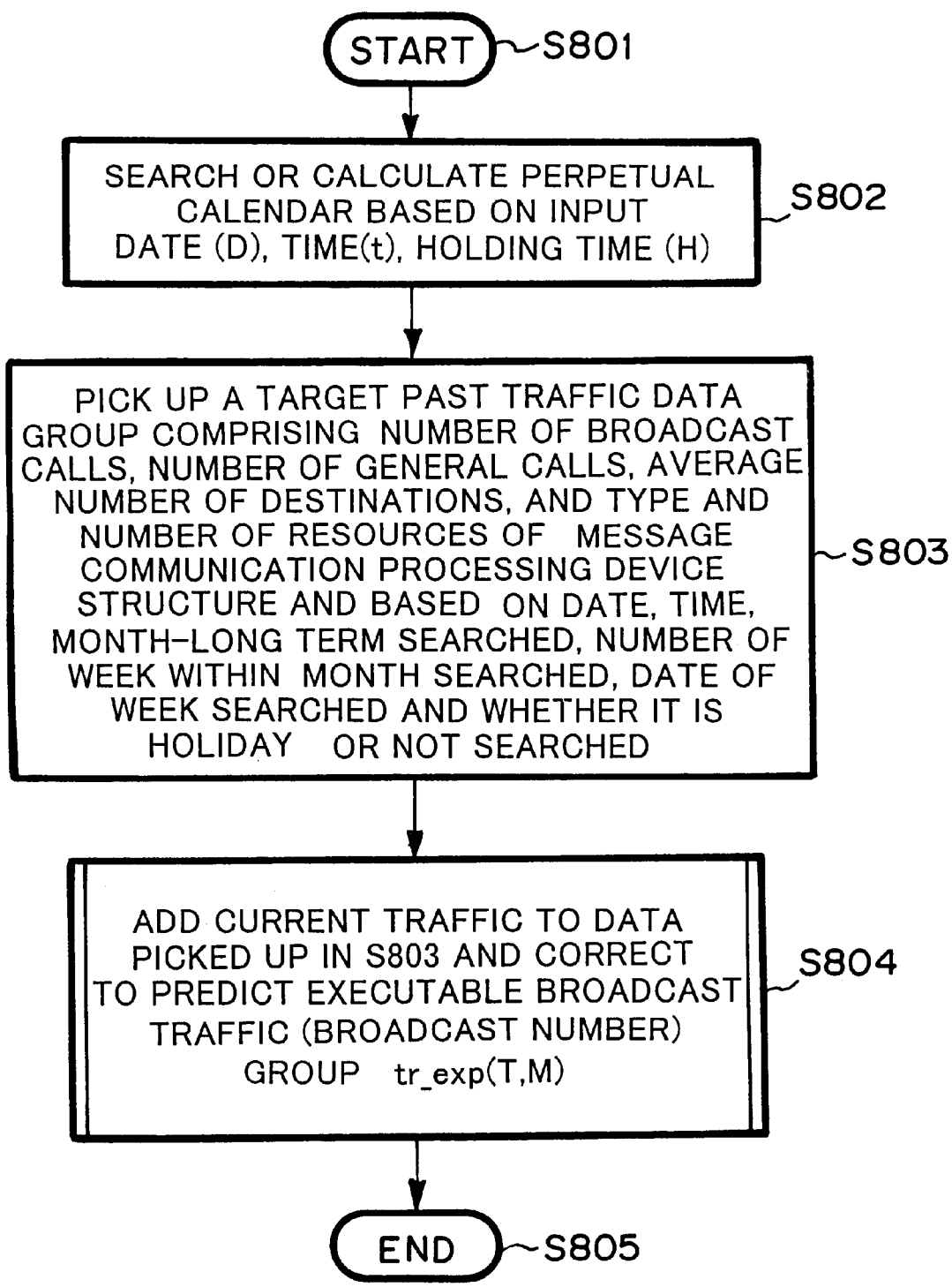
FIG. 8 is a flowchart showing the operation of a broadcast executable traffic prediction processing block.

Next, the operation of executable broadcast traffic prediction processing block B6 will be explained with reference to the flowchart in FIG. 8.

Executable broadcast traffic prediction processing block B6 first searches or calculates a perpetual calendar on the basis of the date (D), the time (t) and the holding time (H) input in S802. Past target traffic data group TR_OLD(M) which includes a number of broadcast calls, number of general calls, average number of destinations, and type and number of resources of the message communication processing device structure, is retrieved on the basis of any one or more of the date, the time, the one- or more-months-term including the date obtained from the perpetual calendar, the number of the week including the date within a month obtained from the perpetual calendar, day of the week of the date obtained from the perpetual calendar, and whether the date is holiday or not obtained from the perpetual calendar in S803. This data group corresponds to local traffic data 10-2 in FIG. 2. Current traffic is added to the data picked up in S803 for compensation, whereby the broadcast executable traffic (i.e. the number of broadcast destinations) group tr_exp (T,M) is predicted, and the broadcast executable traffic group thus predicted is outputted to executable broadcast traffic inquiry response processing block B5 in S804.

The data element and the structure of tr_exp (T,M) are shown in the structural diagram of the broadcast executable traffic (i.e. broadcast amount) tr_exp (T,M) in FIG. 9.

Next, the structure of the broadcast executable traffic (i.e. broadcast amount) tr_exp (T,M) will be explained with reference to FIG. 9.

Reference letters f0 in FIG. 9A represent the number of response combinations. Reference letters f1 represent the usable start time t0 and the number of usable destinations m(t0) for 0-th combination. Reference letters f2 represent the usable start time ti and the number of usable destinations m(t0) for i-th combination. Reference letters f3 represent the usable start time t(N−1) and the number of usable destinations m(t0). FIG. 9B is a summary version of FIG. 9A.

Next, the operation of executable broadcast traffic inquiry response processing block B5 shown in FIG. 7 will be explained again.

After the processing of S703 of executable broadcast traffic inquiry response processing block B5 is finished, tr_exp(T,M) is set to the number of usable destinations in executable broadcast inquiry response signal SG3 in S704. Further, executable broadcast inquiry response signal SG3 is transmitted to inquiry original message communication processing device 4 in S705.

Returning to FIG. 2, executable broadcast inquiry response signal SG3 which is transmitted under the control of executable broadcast traffic inquiry response processing block B5 is received by broadcast request processing message communication processing device 4 through logic connection L3-2 connecting message communication processing device 5-2 and message communication processing device 4.

Figure 3:
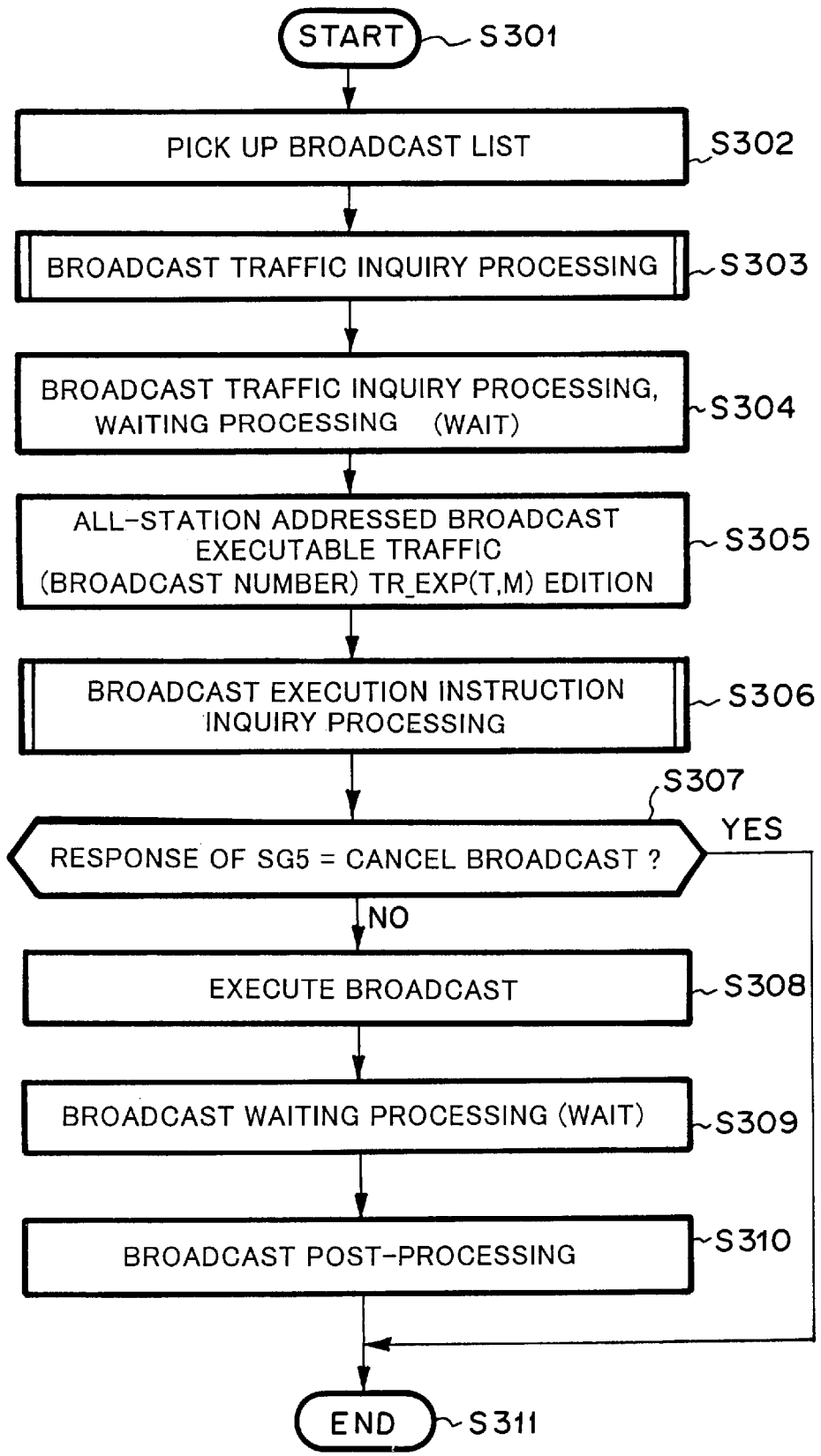
FIG. 3 is a flowchart showing the operation of a broadcast control block at a broadcast instruction side.

In message communication processing device 4, the processing is carried out again in broadcast instruction side broadcast control processing block B1 disposed therein. Broadcast instruction side broadcast control processing block B1 waits for executable broadcast inquiry response signal SG3 which is sent from the destination message communication processing device group from 0-th destination message communication processing device 5-1 to (OC−1)-th destination message communication processing device 5-3. This waiting processing corresponds to S304 in FIG. 3. Thereafter, the all-station addressed broadcast executable traffic (broadcast amount) TR_EXP (T,M) is edited in S305. FIG. 10 shows the structure of all-station addressed broadcast executable traffic (broadcast amount) TR_EXP(T,M).

Next, the structure of the all-station addressed broadcast executable traffic (broadcast amount) TR_EXP (T,M) will be explained with reference to FIG. 10.

In FIG. 10, reference is letters f1-i ($0 \leq i \leq N-1$) represent a time (T+t(i)) at which the service can be started for the i-th time (the first (0-th) to the final (N−1)-th) after the indicated time of the service-start. Reference letters f2-i ($0 \leq i \leq N-1$) represented the number of destination station usable for the i-th time after the indicated time of the service-start. Reference letters.f3-i-0 ($0 \leq i \leq N-1$) represent the station number of the 0-th station usable for the i-th time after the indicated time of the service-start. Reference letters f3-i-j represent the station number of the j-th station usable for the i-th time after the indicated time of the service-start. Reference letters f3-i-2 represent the station number of the (M−1)-th station usable for the i-th time after the indicated time of the service-start.

Returning to FIG. 3, the flow of the operation of broadcast instruction side broadcast control processing block B1 will be explained.

Figure 5:
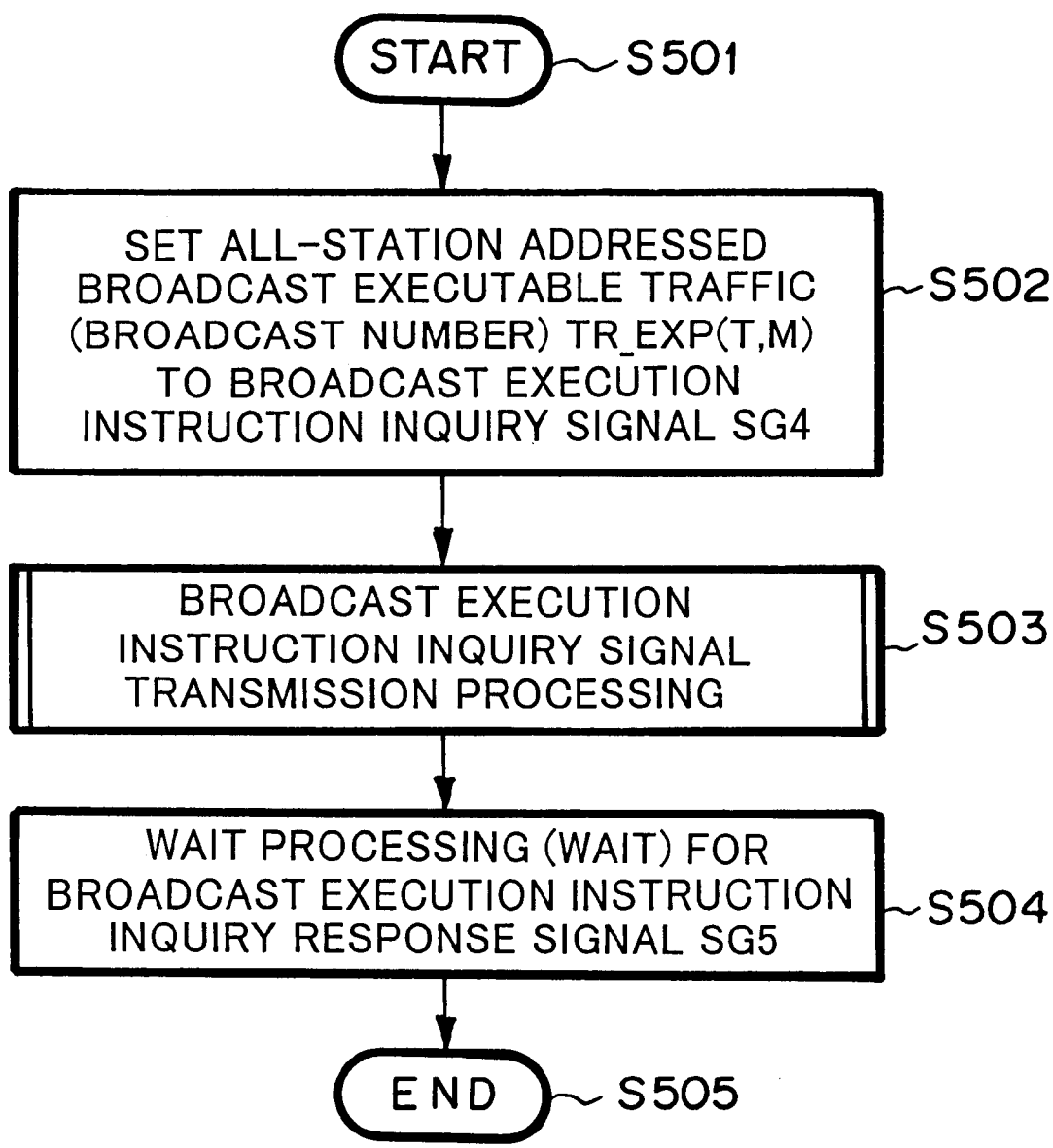
FIG. 5 is a flowchart showing the operation of a broadcast execution instruction inquiry processing block.

In S306, the broadcast execution instruction inquiry processing is executed on the basis of TR_EXP (T,M) for which an edition is finished in S305 by the broadcast instruction side broadcast control processing block B1. This processing corresponds to B3 in FIG. 2. FIG. 5 shows the flow of the operation of broadcast execution instruction inquiry processing block B3.

Next, the operation of broadcast execution instruction inquiry processing block B3 will be explained with reference to the flowchart in FIG. 5.

In S502 in the operation of broadcast execution instruction inquiry processing block B3, all-station addressed broadcast executable traffic (broadcast amount) TR_EXP (T,M) is set to broadcast execution instruction inquiry signal SG4. In S503, the broadcast execution instruction inquiry signal transmission processing is executed. The waiting processing (WAIT) for broadcast execution instruction inquiry response signal SG5 is executed in S504. Upon receiving broadcast execution instruction inquiry response signal SG5, the processing is finished in S505, and the control is returned to broadcast instruction side broadcast control processing block B1 in FIG. 2.

Figure 6:
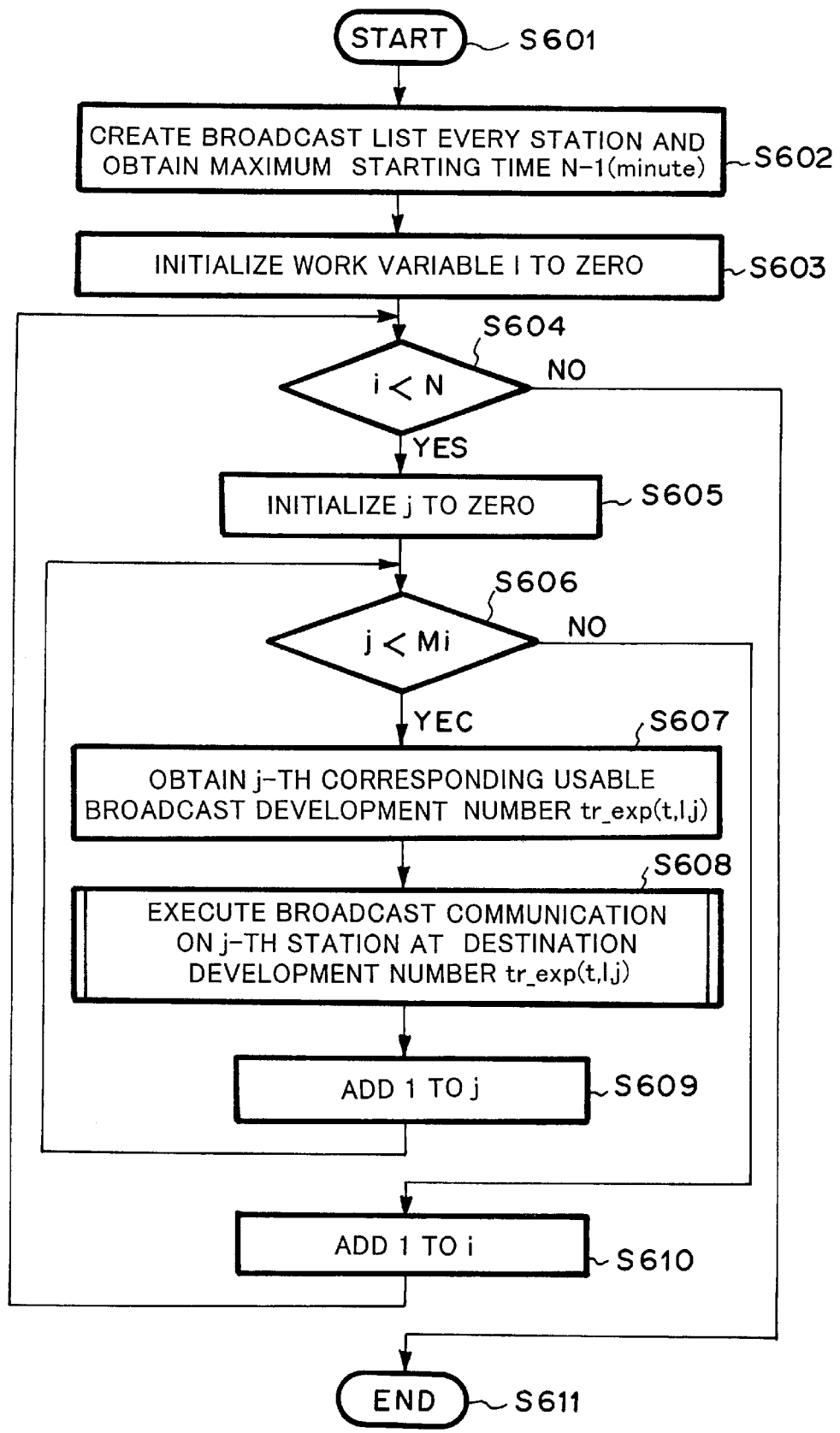
FIG. 6 is a flowchart showing the operation of the broadcast execution processing block.

After processing of S306 is finished, it is judged whether broadcast execution instruction inquiry response signal SG5 is instructing to execute the broadcast communication or cancel the broadcast communication. If broadcast execution instruction inquiry response signal SG5 is instructing to cancel the broadcast, the processing flows to YES branch of S307 to complete in S311. If broadcast execution instruction inquiry response signal SG5 is instructing to execute the broadcast communication, the processing goes to S308 to control the execution of the broadcast communication. The execution of the broadcast communication corresponds to broadcast execution processing block B4 of FIG. 2, and the operation flow thereof is shown in FIG. 6. The operation flow of FIG. 6 is based on the broadcast communication of the destination station development system, however, the different feature from the conventional broadcast communication execution resides in that the operation of the broadcast execution processing block B3 is carried out for each of developed terms tr_exp(t,i,j) (correspond to f4-i-0 to f4-i-2 in FIG. 10) of the structural minimum unit of TR_EXP (T,M) edited in S305 of FIG. 3 in the judgment step S607 for getting information as to whether broadcast execution instruction inquiry response signal SG5 from broadcast request terminal 1 instructs to execute the broadcast communication execution or cancel the broadcast communication, and in the broadcast execution instruction step S608. The other steps are implemented by using the conventional broadcast communication technique, and the explanation thereof is omitted.

After completing the processing of S308, broadcast waiting process in S309 and broadcast post-processing in S310 are executed. Responses from terminals are awaited in S309.

The result of the broadcast communication is notified to terminal 1 in S310.

A first effect of the present invention resides in that a service completion rate is increased and thus serviceability can be enhanced. When the network resource usage rate of general point-to-point calls is low, the service completion time of the broadcast communication can be shortened. This is because the broadcast communication is executed in conformity with the numeral which is predicted from past traffic data so that broadcast destinations are matched with the broadcast executable traffic of the destination stations.

A second effect resides in that the utilization of general calls of point-to-point communication by users is prevented from being impaired. The reason for this is the backside of the reason for the first effect, that is, this is because when the network resource usage rate of general calls of point-to-point is high, the number of destinations in the broadcast execution development is suppressed.

A third effect resides in that the operability of the broadcast communication instructor is improved. This is because the broadcast communication instructor is provided with a service completion prediction time for making decision on executing the broadcast communication.

What is claimed is:

1. A broadcast communication system comprising:
   a first terminal for transmitting broadcast data and transmitting a start time when transmission of the broadcast data starts;
   a first message communication processing apparatus for receiving the broadcast data and start time transmitted from said first terminal and transmitting the broadcast data and start time received from said first terminal;
   one or more second message communication processing apparatus for receiving the broadcast data and start time transmitted from said first message communication processing apparatus and transmitting the broadcast data received from said first message communication processing apparatus; and
   one or more second terminals for receiving the broadcast data transmitted from said one or more second message communication processing apparatus;
   wherein said second message communication processing apparatus comprises means for generating executable broadcast traffic information on the basis of past traffic information and the start time; and
   wherein said first message communication processing apparatus comprises:
      means for retrieving the executable broadcast traffic information from said second message communication processing apparatus;
      means for scheduling transmission of the broadcast data from said first message communication processing apparatus on the basis of the executable broadcast traffic information.

2. The broadcast communication system as set forth in claim 1, wherein said first message communication processing apparatus further comprises means for inquiring said first terminal as to whether to execute the transmission of the broadcast data.

3. The broadcast communication system as set forth in claim 1, wherein a time when the transmission of the broadcast data ends is estimated on the basis of the past traffic information and start time.

4. The broadcast communication system as set forth in claim 3, wherein the executable broadcast traffic information includes the number of said second terminals accessible for each of said second message communication processing apparatus for every period of time from the start time of the transmission of the broadcast data to the end time of the transmission of the broadcast data.

5. The broadcast communication system as set forth in claim 1, wherein said means for generating executable broadcast traffic information generates said executable broadcast traffic information on the basis of a number of broadcast calls, a number of general calls, an average number of destinations, and a type and number of resources included in the past traffic information corresponding to any one or more of the start time of transmission of the broadcast data, a date of the start time, a one- or more-months-term including the date, a number of a week including the date within a month, date of the week of the date, and whether the date is a holiday.

6. The broadcast communication system as set forth in claim 5, wherein said means for generating executable broadcast, traffic information further uses current traffic information for compensating the executable broadcast traffic information.

7. A broadcast communication method comprising:
   transmitting broadcast data and a start time when the transmission of said broadcast data starts, from a first terminal;
   receiving the broadcast data and start time transmitted from said first terminal by a first message communication processing apparatus;
   transmitting the broadcast data and start time received from said first terminal by said first message communication processing apparatus;
   receiving the broadcast data and start time transmitted from said first message communication processing apparatus by a second message communication processing apparatus;
   transmitting the broadcast data received from said first message communication processing apparatus by the second message communication processing apparatus to one or more second terminals;
   causing said second message communication processing apparatus to generate executable broadcast traffic information on the basis of past traffic information and the start time; and
   causing said first message communication processing apparatus to retrieve the executable broadcast traffic information from said second message communication processing apparatus; and
   causing said first message communication processing apparatus to schedule transmission of the broadcast data on the basis of the executable broadcast traffic information.

8. The broadcast communication method as set forth in claim 7, further comprising inquiring said first terminal as to whether to execute the transmission of the broadcast data.

9. The broadcast communication method as set forth in claim 7, wherein a time when the transmission of the broadcast data ends is estimated on the basis of the past traffic information and start time.

10. The broadcast communication method as set forth in claim 9, wherein the executable broadcast traffic information includes the number of said second terminals accessible for each of said second message communication processing apparatus for every period of time from the start time of the transmission of the broadcast data to the end time of the transmission of the broadcast data.

11. The broadcast communication method as set forth in claim 7, wherein said step of generating executable broadcast traffic information includes a step of using a number of broadcast calls, a number of general calls, an average number of destinations, and a type and number of resources included in the past traffic information corresponding to any one or more of the start time of transmission of the broadcast data, a date of the start time, a one- or more-months-term including the date, a number of a week including the date within a month, date of the week of the date, and whether the date is a holiday.

12. The broadcast communication system as set forth in claim 11, wherein said step of generating executable broadcast traffic information further includes a step of using current traffic information for compensating the executable broadcast traffic information.

13. A communication system for scheduling broadcast data, the system comprising:

a transmitting terminal which is effective to transmit broadcast data and a start time for broadcast data;

at least one receiving terminal;

a first message processing device which receives the broadcast data and the start time from the transmitting terminal, the first message processing device being effective to transmit the broadcast data based on a schedule and to transmit the start time to at least one second message processing device;

the at least one second message processing device receives the broadcast data and the start time from the first message processing device, the second message processing device generates executable broadcast traffic information based on prior traffic information and based on the start time, the second message processing device further conveys the broadcast data to one of the receiving terminals; wherein:

the second message processing device forwards the executable broadcast traffic information to the first message processing device; and the first message processing device produces the schedule of the broadcast data based on the executable broadcast traffic information.

14. A method for scheduling transmission of broadcast data, the method comprising:

transmitting broadcast data and a start time of the broadcast data from a transmitting terminal to a first message processing device;

receiving the broadcast data and start time by the first message processing device;

forwarding the broadcast data from the first message processing device to a second message processing device based on a schedule;

forwarding the start time from the first message processing device to the second message processing device;

receiving the start time by the second message processing device;

generating executable broadcast traffic information based on prior traffic information and based on the start time at the second message processing device;

forwarding the executable broadcast traffic information from the second message processing device to the first message processing device; and producing the schedule of the transmission of the broadcast data based on the executable broadcast traffic information.

* * * * *